May 12, 1970 R. H. O'CONNOR 3,511,170
TOASTER ACCESSORY FOR BROILING MEAT
Filed Oct. 8, 1968
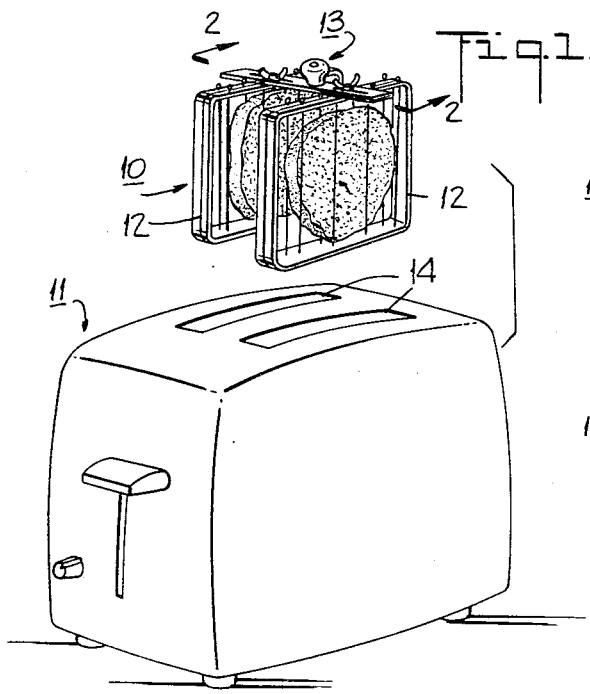
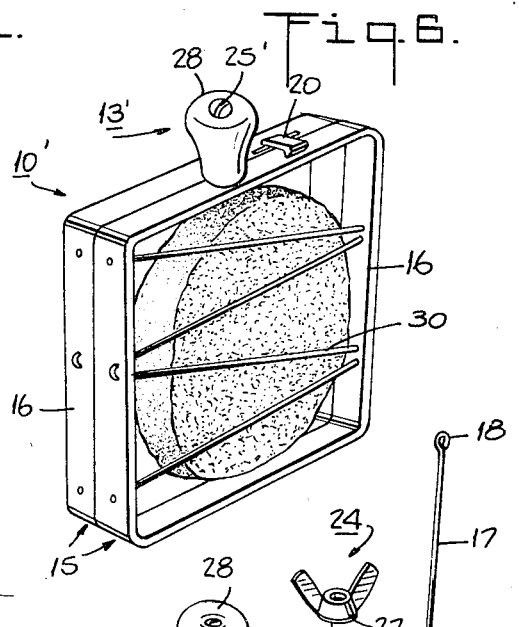
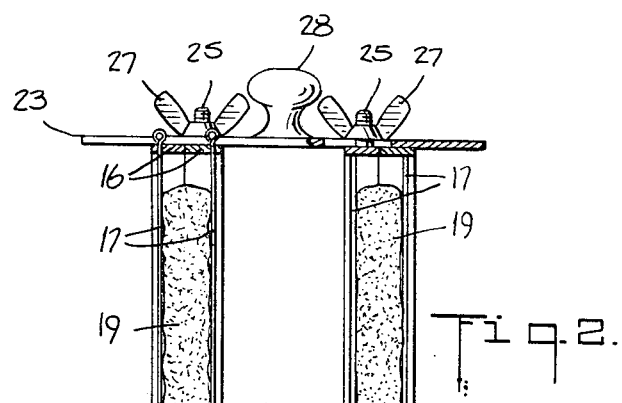
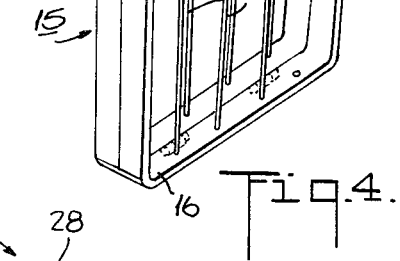
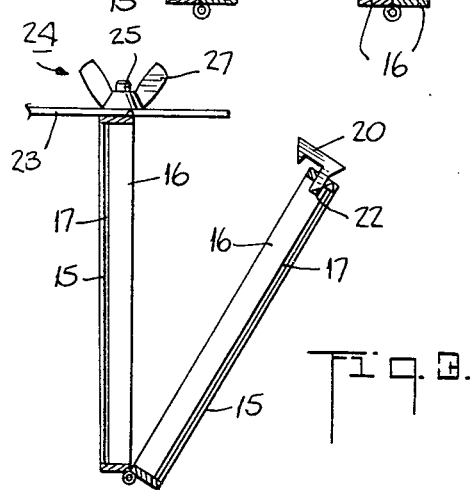
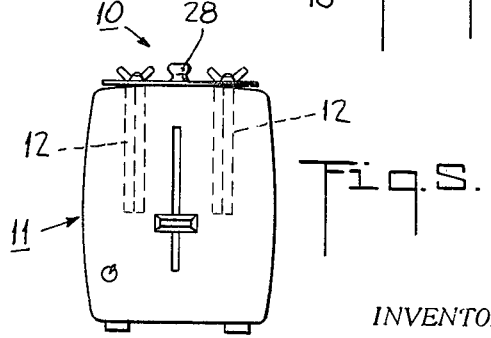
INVENTOR.
ROBERT H. O'CONNOR
BY
Kenyon & Kenyon
ATTORNEYS United States Patent Office 3,511,170
Patented May 12, 1970

3,511,170
TOASTER ACCESSORY FOR BROILING MEAT
Robert H. O'Connor, 1777 E. 48th St.,
Brooklyn, N.Y. 11234
Filed Oct. 8, 1968, Ser. No. 765,928
Int. Cl. A47j 37/08
U.S. Cl. 99—402                                9 Claims

ABSTRACT OF THE DISCLOSURE

The frames of the toaster accessory are each made with a rectangular shape with a plurality of straight pins passing through the opening in the frame to contain the meat therein. The hinged sections of each frame are locked together by a releasable clamp mounted at the top and are sized to fit within the opening of a pop-up type toaster. A handle can be secured to one or more frames to broil one or more hamburgers.

---

This invention relates to a toaster accessory for broiling meat. More particularly, this invention relates to a toaster accessory for broiling hamburgers.

Heretofore, various accessories have been provided for electrical toasters of the pop-up type. For example, such accessories have enclosed pieces of bread within hinged sections of a frame for toasting of the bread within the toasters in order to prevent any crumbs from falling into the totaster. In addition, it has been suggested to broil various types of meat such as hamburger meat within such totaster accessories. Usually, these toaster accessories have been provided with various types of mesh screens in order to contain the bread or other substances therein. However, because the mesh material has been so closely woven together, sufficient heat cannot be directed through the screens to properly heat the substance positioned within the frame. Also, in those cases where foods such as hamburger is to be placed within such frames, the mesh-like frames would permit such an accumulation of food particles or grease thereon as to block the passage of heat therethrough. Furthermore, especially in the case of grease, such frames have not been easily cleaned.

Accordingly, it is an object of this invention to provide a toaster accessory for toasting hamburgers.

It is another object of the invention to provide a toaster accessory that can be easily cleaned.

It is another object of the invention to provide a toaster accessory which permits an efficient use of heat generated within a toaster for broiling food stuffs.

It is another object of the invention to provide a toaster accessory which is compact and easily used.

It is another object of the invention to provide a toaster accessory which is relatively inexpensive to manufacture.

It is another object of the invention to provide a toaster accessory which is able to cook one or more hamburgers.

Briefly, the invention provides a toaster accessory for broiling one or more food stuffs such as hamburger. The toaster accessory includes at least one meat containing frame which is made up of a pair of hinged sections. Each section of a frame includes a continuous outer side wall which defines an opening in which the food stuff is to be positioned. In addition, a plurality of spaced wires are inserted transversely of the side wall of each frame in order to contain the food stuffs within the frames and to permit a sufficient amount of heat to pass through the frames into the foodstuffs. Also, at least one of the sections of the frame is provided with a releasable clamp for engagement in a complementary recess on the other of the sections in order to secure the two sections together upon closing about a foodstuff. The toaster accessory also includes a handle means which is secured to each of the frames in order to permit insertion and removal into an electric toaster, such as, a pop-up toaster. This handle means includes an insulated knob with facilitates the handling of the meat containing frame specially after heating.

The meat containing frame is dimensioned so that upon being positioned into the interior of a toaster the side wall of the two sections making up a frame substantially seal off the entrance opening into the toaster. This permits the toaster to act substantially in an oven-like manner so that substantially all of the heat generated within the toaster is passed through the two sides of the toaster accessory. In this way a hamburger or similar foodstuff positioned within the toaster accessory is broiled from both sides simultaneously.

These and other objects and advantages of the invention will become more apparent when taken in conjunction with the following detailed description and accompanying drawings in which:

FIG. 1 illustrates an exploded perspective view of a toaster and a toaster accessory according to the invention;

FIG. 2 illustrates a view taken on line 2—2 of FIG. 1 of the toaster accessory;

FIG. 3 illustrates a cross sectional view of a frame of the toaster assembly in an open position in accordance with the invention;

FIG. 4 illustrates a partial perspective view of a meat containing frame, removable pin and handle means according to the invention;

FIG. 5 illustrates the position of a toaster accessory of FIG. 1 in a toaster; and FIG. 6 illustrates a meat containing frame of the invention for use with a single hamburger.

Referring to FIG. 1, the toaster accessory 10 is sized to fit within a toaster 11, e.g. an electrical pop-up type. The toaster accessory 10 is provided with two meat-containing frames 12 and a handle means 13 which supports the two meat containing frames 12 in spaced relation to each other for simultaneous insertion into the entrance openings 14 of the toaster 11.

Referring to FIGS. 2 and 4, each meat containing frame 12 is made up of a pair of sections 15 which are hinged together at one end thereof. Each of the sections 15 is formed of a continuous side wall 16 which defines a rectangular opening for example, sized to the toaster openings 14. In addition, each section 15 has a plurality of wires 17 in the form of straight pins which are removably mounted in the side walls 16 across the openings defined therein. Each straight pin 17 is formed with a loop 18 at one end thereof which is adapted to rest on the upper side wall 16 of the frame section 15 while the opposite straight end of pin 17 is adapted to be received within an opening in the opposite wall of the frame section 15. These pins 17 are spaced apart a sufficient distance to permit a foodstuff 19 to be held in a secure position within the meat containing frame 12 while also allowing the heat generated within the toaster 11 to pass through to the foodstuff 19. In this regard, the pins 17 can be dimensioned with a relatively thin thickness or diameter while being spaced apart at least 10 diameters. For example, the pins can be approximately 1/16 of an inch in diameter and the space between pins can be approximately one inch.

Additionally, referring to FIGS. 3 and 4, a releasable clamp 20 is mounted on the top of one of the frame sections 15 on the same side wall 16 as the loops 18 of the pin 17. This releasable clamp 20 is adapted to engage a groove 21 in the opposite frame section 15 so as to secure the sections together in an enclosed manner around the foodstuff 19 therebetween. For example, the releasable clamp includes a pivotally mounted clasp which engages in a suitable groove on the opposite frame section 15. The clasp is urged against the opposite frame section 15 by torsion springs 22 secured together under the underside of the side wall 16.

Referring to FIGS. 2 and 4, the handle means 13 which supports the two meat containing frames 12 includes a spacer bar 23 and a locking means 24 on each of the meat containing frames 12. The locking means 24 includes a threaded bolt 25 which is fixed to the frame section 15 containing the groove 21 which cooperates with the releasable clamp 20 and passes through an elongated slot 26 in the spacer bar 23. In addition the locking means 24 includes a wing nut 27 or the like which is threaded onto the bolt 25 on the opposite side of the spacer bar 23 for locking the meat containing frame to the bar 23 at a predetermined point. The spacer bar 23 also mounts an insulated knob 28 centrally thereof. This insulating knob 28 facilitates manipulation of the toaster accessory 10 upon insertion into the toaster and upon removal from the toaster.

The sections 15 of each frame 12 are further provided with a transverse groove 29 in the upper side walls 16 which is sized to receive the spacer bar 23. These grooves 29 serve to restrain the respective frames 12 against rotation about the bolts 25 relative to the spacer bar when the spacer bar 23 is secured in place.

In use, the meat containing frame 12 of a toaster assembly is opened (FIG. 3) so as to be able to receive a foodstuff such as a hamburger patty. After the hamburger patty has been placed on one of the sections 15 of the frame the sections 15 are brought together and locked in place by way of the releasable clamp 20. The hamburger patty is then contained within the meat containing frame 12 by virtue of the pins 17. Next, the meat containing frames 12 are adjusted along the spacer bar 23 of the handle means 13 in order to be properly spaced with respect to each other and with respect to the toaster openings 14 in the toaster 11. Thereafter, the toaster accessory 10 with the hamburger patties in place is dropped into the openings 14 of the toaster 11 (FIG. 5). The toaster 11 is then actuated in the usual manner and heat is generated therein to broil the hamburger patties in the respective meat containing frame 12 of the toaster accessory 10. Upon completion of one or more heating cycles, the toaster accessory 10 can be removed from the toaster 11 with the completely cooked or broiled hamburgers. Each accessory 10 is then opened up manually or otherwise by releasing the clamp 20 from within the groove 21 in the opposite side wall. The cooked hamburger can then be removed.

Referring to FIG. 6, the toaster accessory 10' can be made for cooking only a single hamburger. That is, the handle means 13' can be mounted directly on the side wall 15 of the section mounting the releasable clamp 20. That is, the handle means is constructed by threading the insulating knob 28 onto a bolt 25' on the insulating 15. In addition, instead of using straight pins, a single continuous wire 30 can be used. Such a wire 30 can be threaded in a zig-zag pattern across the side walls 16 on the opposite sections 15. Alternatively, straight pins can also be used in an inclined manner to form a zig-zag pattern.

The invention thus provides a toaster accessory which can easily and quickly permit the broiling of foodstuff such as hamburgers. Furthermore, the toaster accessory is easily cleaned since the areas for accumulation of grease or other matter are substantially reduced. Also, in those instances where the wires are removably secured within the accessory such wires can be removed and cleaned separately of the frames.

The invention also provides a toaster accessory which can be made to broil one or more foodstuffs. That is with a suitable handle means, the toaster accessory can be made to cook as many as four or more hamburgers depending upon the toaster being used for generation of the heat necessary to broil the hamburger.

It is noted that the toaster accessory frames are constructed in a manner with dimensions which permit the toaster to act substantially as an oven. That is, once the toaster accessory is dropped into the openings of a toaster, the openings are substantially closed. Thus, the heat which is generated within the toaster is maintained within the toaster without escaping into the surrounding environment. This allows the toaster to be more efficient in the broiling of hamburgers. Further, it is noted that the materials from which the toaster accessory frames are made can be, for example, of aluminum or any other heat resistant material.

It is also noted that the toaster accessory frames are sized so as to lie substantially out of the plane of the heating coils of a toaster so that heat is not directly imposed on the side walls of the accessory.

What is claimed is:

1. A toaster accessory for broiling meat comprising at least one meat containing frame, said frame including a pair of sections having a continuous side wall defining an opening therethrough, said sections being hinged together at one side thereof, a plurality of spaced wires passing through each said side wall to subdivide the opening in each section, and a releasable clamp mounted on one of said sections for engagement in a groove on the other of said sections; and a handle means secured to said other of said sections for moving said frame into and out of a toaster.

2. A toaster accessory as set forth in claim 1 wherein each said side wall defines a rectangular opening.

3. A toaster accessory as set forth in claim 1 wherein said wires are removably mounted in each said side wall.

4. A toaster accessory as set forth in claim 3 wherein said wires are straight pins.

5. A toaster accessory as set forth in claim 4 wherein said pins are spaced apart at least 10 diameters.

6. A toaster accessory as set forth in claim 1 wherein said frame is made of aluminum.

7. A toaster accessory as set forth in claim 1 wherein said sidewalls of said sections are of a width to close off the entrance opening of a toaster receiving said frame.

8. A toaster assembly as set forth in claim 1 which comprises a pair of said frames and said handle means includes a bar slideably mounted on each frame and means for locking each frame to said bar in spaced relation to the other frame.

9. A toaster assembly as set forth in claim 8 wherein said handle means further includes an insulated upstanding knob centrally of said bar.

References Cited

UNITED STATES PATENTS

| 386,170 | 7/1888 | Van Dorn | 99—402 |
| 715,700 | 12/1902 | Smith | 99—402 XR |
| 1,517,795 | 12/1924 | Morrisson et al. | 99—402 XR |
| 1,903,324 | 4/1933 | Codling | 99—392 |
| 2,849,947 | 9/1958 | Bork | 99—402 |
| 3,046,870 | 7/1962 | Bork | 99—402 |
| 3,094,061 | 6/1963 | Cole | 99—402 |

FOREIGN PATENTS 228,522  1/1926  Great Britain.

BILLY J. WILHITE, Primary Examiner